Dec. 3, 1940.   S. J. HARLEY   2,223,889
RING GAUGE FOR SPLINED WORK
Filed May 13, 1940
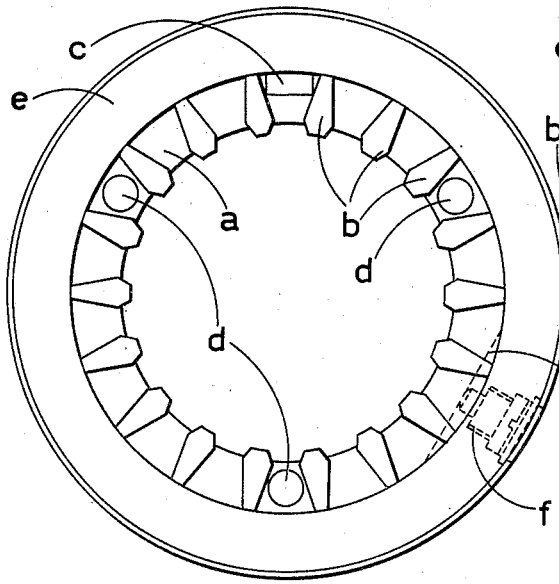
FIG. I.
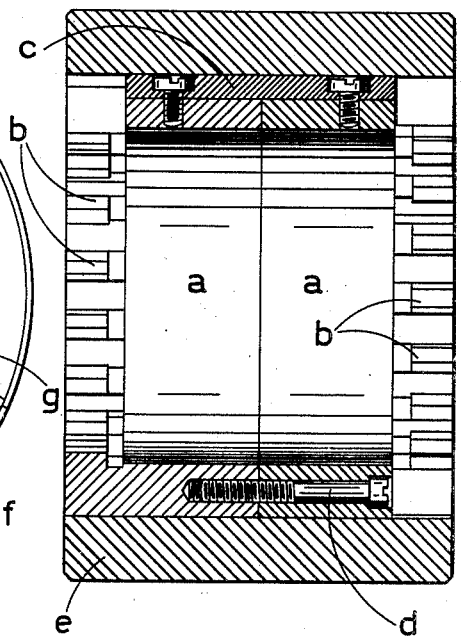
FIG. 2.
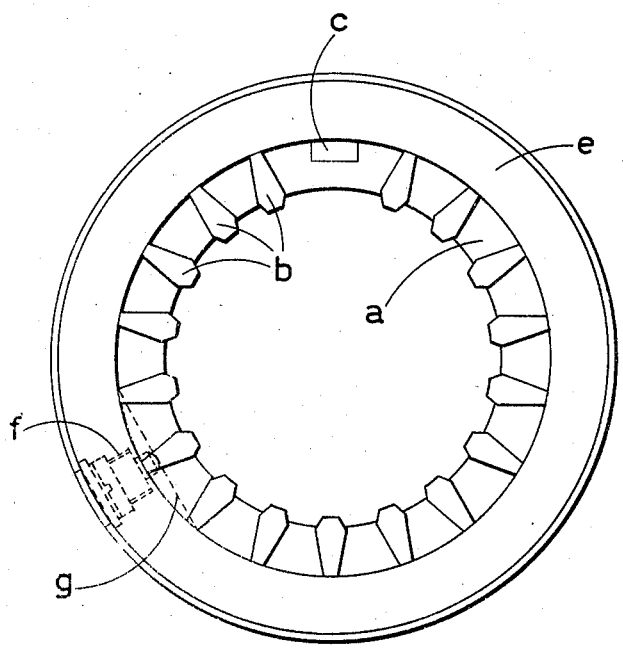
FIG. 3.
Inventor:
Stanley J. Harley
by Babcock & Babcock
Attorneys Patented Dec. 3, 1940

2,223,889

UNITED STATES PATENT OFFICE 2,223,889

RING GAUGE FOR SPLINED WORK

Stanley Jaffa Harley, Coventry, England

Application May 13, 1940, Serial No. 334,959
In Great Britain September 20, 1938

3 Claims. (Cl. 33—174)

For the purpose of checking the form and dimensions of externally splined work it is usual to employ a ring gauge having at one end an annular series of gauging projections, the pitch of which corresponds with that of the splines. Since these projections are usually formed by milling and grinding operations across the end of the gauge in conjunction with a suitable dividing head, there is necessarily a limit to the maximum number of projections that can be produced in this way for a given gauge diameter, beyond which limit it is impossible to employ milling and grinding tools of sufficient rigidity to guarantee the accuracy required for high precision work.

The object of the present invention is to provide an improved construction of gauge for use more especially in cases where the pitch of the splines for a given diameter of work is so small that it would be impracticable to produce a sufficiently accurate gauge of the kind above described.

According to the invention one end of the improved gauge is formed and adapted to check certain only of the splines, the remaining splines being checked by the suitably formed other end of the gauge, preferably the splines checked by one end of the gauge will be alternate with those checked by the other end of the gauge. In any case the sum of the gauging projections at the two ends of the gauge may be equal to the total number of splines on the work so that when the gauge has been passed completely over the work it will check the form and dimensions of all the splines.

In the accompanying drawing,

Figures 1 and 2 are end and longitudinal sectional views of the improved gauge.

Figure 3 is a view of the other end of the gauge.

The improved gauge may be made in one piece but for convenience of manufacture it is preferably made, as shown, in transversely divided halves $a$, $a$ each having a series of gauging projections $b$, $b$ at one end adapted to check the form and dimensions of alternate splines. The two halves are assembled upon a male check gauge with the projections on one half angularly staggered with respect to the projections on the other half. In this position they are locked against relative angular displacement by means of a key $c$ and are secured together with their adjacent plain ends abutting against each other by means of screws $d$, the heads of which are covered by lead seals. The complete gauge is then housed within a holder $e$ in which it is fixed by means of a screw $f$, the end of which engages a recess $g^1$ in the abutting ends of the two parts of the gauge.

Since the pitch of the gauging projections $b$, $b$ at each end of the gauge is twice the pitch of the splines on the work to be gauged it is easily possible by existing methods to produce a ring gauge for externally splined work in which the number of splines for a given diameter is at least twice as great as that for which a gauge could be accurately made with the pitch of the projections equal to that of the splines.

In the specific example shown the gauge is designed for a shaft having 36 splines, each end of the gauge being formed with 18 projections $b$, $b$.

It will thus be seen that by means of this invention it is quite possible to produce the projections in the gauge by means of milling and grinding tools of sufficient rigidity to guarantee the accuracy required for high precision work.

In order to allow for the introduction and removal of the key $c$ one of the projections at one end of the gauge is removed, as shown in Figure 3.

I claim:

1. A ring gauge for splined work comprising, a body member having a cylindrical bore extending therethrough, two relatively axially spaced annular series of gauging projections secured coaxially in said bore, and means for thus securing said series of projections, said projections extending radially inwardly beyond the surface of said bore, and the projections of one said series being out of axial alignment with the respective projections of the other said series.

2. A ring gauge for splined work comprising, a body member having a bore formed therein, two relatively axially spaced annular series of radially inwardly extending gauging projections secured coaxially in said bore with the projections of one said series out of axial alignment with the projections of the other said series, and means for thus securing said series of projections.

3. A gauge for splined work comprising, a ring type gauge body, and a plurality of relatively immovable axially disposed concentric series of radially inwardly projecting gauging projections carried by said body, with the projections of one said series disposed out of axial alignment with the respective projections of another of said series.

STANLEY JAFFA HARLEY.